United States Patent [19]

Van Scoy

[11] 4,425,806
[45] Jan. 17, 1984

[54] MODULAR ORIFICE METER WITH ISOLATION CHAMBER VALVE CLOSURE

[75] Inventor: Davis A. Van Scoy, Simonton, Tex.

[73] Assignee: Grove Valve and Regulator Company, Oakland, Calif.

[21] Appl. No.: 362,883

[22] Filed: Mar. 29, 1982

[51] Int. Cl.³ .............................................. G01F 1/42
[52] U.S. Cl. .................................. 73/861.61; 138/44
[58] Field of Search .......... 73/272 R, 861.61, 861.62, 73/432 D; 138/44, 94, 94.3

[56] References Cited

U.S. PATENT DOCUMENTS

| | | | |
|---|---|---|---|
| 1,662,374 | 3/1928 | Woodmansee | 138/44 |
| 1,965,826 | 7/1934 | Daniel | 138/44 |
| 2,050,544 | 8/1936 | Robinson et al. | 138/44 |
| 2,448,071 | 8/1948 | Anderon | 138/44 |
| 2,896,668 | 7/1959 | Aitken | 138/94.3 X |
| 4,343,193 | 8/1982 | Dawson | 73/861.61 |

*Primary Examiner*—Herbert Goldstein
*Attorney, Agent, or Firm*—Melvin R. Stidham

[57] ABSTRACT

A modular orifice meter construction comprising a main housing wherein an orifice disc carrier is positioned to seal around axially aligned flow tubes. A service housing with an access opening for replacement of orifice discs may be bolted into the main housing. A closure for said access opening is pivoted to the service housing and is normally held closed by a wedging clamp lock. A pinion rotatably mounted on the service housing raises and lowers the orifice disc carrier by engagement with a rack on the carrier. An isolating gate valve may be mounted between the main and service housings.

4 Claims, 3 Drawing Figures

MODULAR ORIFICE METER WITH ISOLATION CHAMBER VALVE CLOSURE

BACKGROUND OF THE INVENTION

Natural gas generally is sold by volumetric measurement, and one way to measure the volume of a flowing gas is to pass it through an orifice of a known size to measure the pressure drop across it. An orifice meter comprises a housing within which a disc with an orifice is supported in a gas pipeline, the housing being fitted with pressure taps for measuring pressure immediately upstream and downstream of the orifice. Because the orifice is subject to wear by impacting of sand, lime scale, and other foreign particles in the flowing stream, it must be replaced at frequent intervals to ensure accuracy and measurement. A basic orifice meter may comprise simply a housing in which a carrier holding an orifice disc is received. A junior type orifice meter may include means for moving the carrier and disc to a displaced compartment which is accessable from the outside for servicing. In either case, the pipeline must be shut down or bypassed while the worn orifice disc is removed from the body and replaced with a new disc. In the more sophisticated, or senior type orifice fittings, the orifice disc carrier is moved out of the flow passage to a displaced compartment of the housing, which is then isolated from the flow passage so that flow can continue while the orifice disc is being replaced, with the parties assuming that there is a continuing, constant flow rate based on previous measurements.

Economics may dictate that the purchase of an orifice meter be limited to the less expensive basic or junior type fitting. However, if circumstances later justify the acquisition of a more expensive embodiment, the only generally available choice is to remove the old meter and replace it with the new, with the hope that the old meter has some salvage or resale value to minimize the new investment.

OBJECTS OF THE INVENTION

It is an object of this invention to provide an orifice meter of the junior type, which can be converted without substantial modification to a senior type fitting.

It is a further object of this invention to provide orifice fittings which can be purchased in basic or junior fitting configuration and later, by addition of modules, converted to the senior type fitting.

It is a further object of this invention to provide an orifice meter wherein an orifice disc may be removed and replaced in a minimum amount of time.

It is further object of this invention to provide an orifice meter wherein the orifice carrier may be removed to carry the orifice to a displaced chamber outside of the flow passage, with means for sealing off that chamber from gas flow in the pipeline.

Other objects and advantages of this invention will become apparent from the description to follow, particularly when read in conjunction with the accompanying drawings.

SUMMARY OF THE INVENTION

In carrying out this invention, there is provided a valve-like body, including a pair of parallel inner surfaces, between which is slidably carried a flat gate-like orifice disc carrier. Flow passages extend through the valve body plates and, when carrier is in position, an orifice disc is positioned across the flow opening, so that a pressure drop across it can be measured. Suitable seal rings seal between the body and both sides of the gate around the flow opening.

In order to replace or service the orifice disc in the basic mode, a cover is simply removed and the carrier lifted from the housing. In the junior mode, the carrier is raised to a compartment, which is above the flow passages and which has an access opening through which the plate may be removed. Suitable means for raising and lowering the carrier comprises a rack along the edge of the carrier engaged by a pinion rotatable on the body.

In the junior mode, the gas pipeline is shut down while the orifice disc is being replaced. In the senior mode, a valve body is interposed between the main body and the service body compartment and a wedge gate valve is actuated to close off the access opening to the service compartment, so that it is in sealed isolation from the flow passages. Hence, gas flow can continue through the pipeline while the orifice disc is being serviced or replaced.

DESCRIPTION OF A PREFERRED EMBODIMENT

Figure 1:
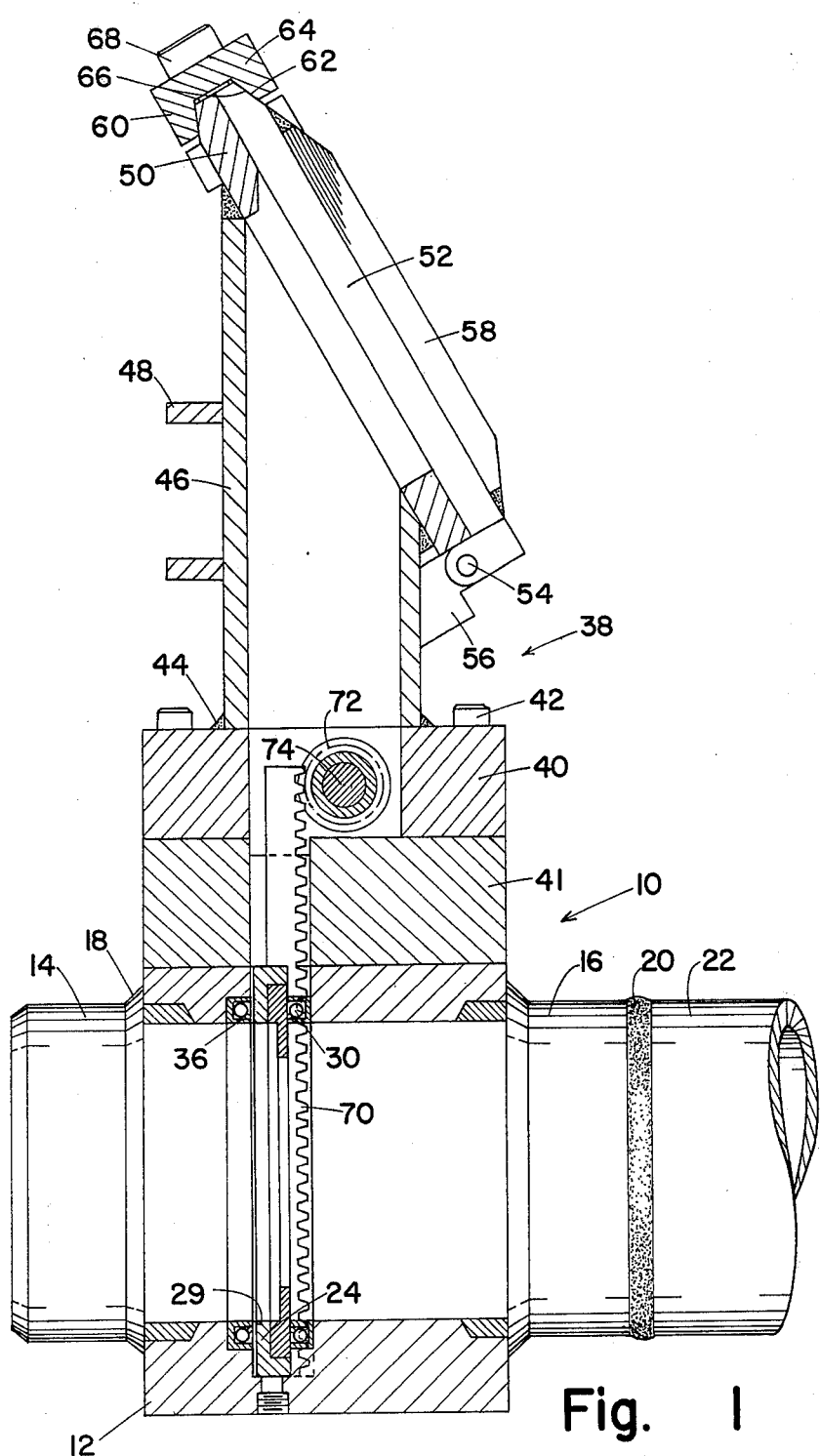
FIG. 1 is a vertical section view of an orifice meter of this invention in the junior mode embodiment.

Referring now to the drawings with greater particularity, the orifice meter 10 of this invention includes a basic body unit 12 and with flow tubes 14 and 16 welded thereto at 18, the flow tubes 14 and 16 being adapted to be welded at a pipeline 22.

The basic unit also includes an orifice disc carrier 24 in which is secured, as by screws 25 (FIG. 3) an orifice disc 26 including an orifice opening 28 of predetermined fixed diameter. The carrier 24 is in face to face engagement with complementary surfaces 29 on the body 12, and seal rings 30 on either the body surfaces 29 or the carrier 24 seal around the orifice disc 26 to prevent any leak path around it. The basic unit may be simply closed off by a suitable cover (not shown) secured to the body 12, as by means of bolts.

In the so-called "junior mode" the operating housing 12 is covered by a service housing 38 including a mounting flange or block 40 which is bolted to the housing 12, as by means of cap screws 42, with a spacer block 41 interposed between the mounting flange 40 and the housing 12. Welded at 44 to the mounting flange 40 is an enclosure 46, which may be reinforced by suitable ribs 48. The top of the housing is cut at an angle as shown, and welded thereto is a top seal plate 50, which is engagable by a closure member or door 52, which is pivoted at 54 to a fixed hinge mounting 56 welded to the service body 46. The door 52 may be provided with strengthening ribs 58 as shown.

The seal plate 50 and door 52 are provided with complementary chamfered surfaces 60 and 62 at their outer ends, which surfaces are engaged by a clamping bar 64 with wedging inner surfaces 66. Hence, when the screw 68 is tightened down to an anchor block 70 (FIG. 3) on the service housing, the door 52 is tightly secured.

Figure 2:
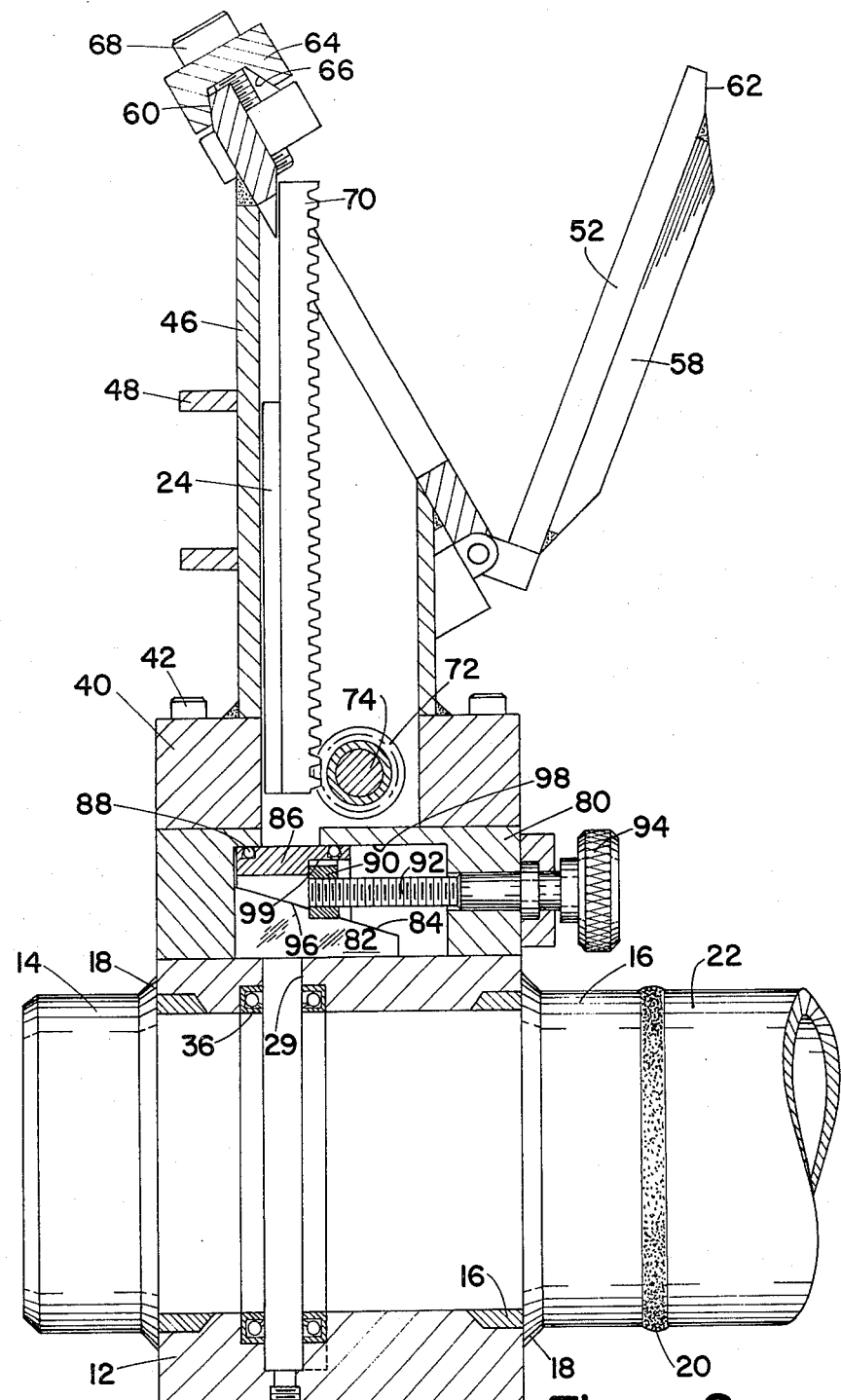
FIG. 2 is a vertical section view of the orifice meter in the senior mode embodiment.

When the carrier 24 is raised up into the service housing 46 the bolt 68 may be loosened to release the hinged closure 52 as shown in FIG. 2, to provide direct access to the carrier plate 24 for servicing or changing the orifice disc 26.

Suitable means for raising the carrier plate 24 comprises a pair of racks 70 secured along the sides of the orifice carrier 24 (FIG. 3) to be engaged by pinions 72 keyed to a shaft 74, which is rotatable in the mounting block or flange 40. Hence, by turning a crank 76 (FIG. 3) the racks may be lifted to raise the carrier 24 to the position shown in FIG. 2 for servicing or replacement of the orifice disc 26. Of course, while this is being done, the pipeline 22 is bypassed or closed off by suitable valve means (not shown).

Figure 3:
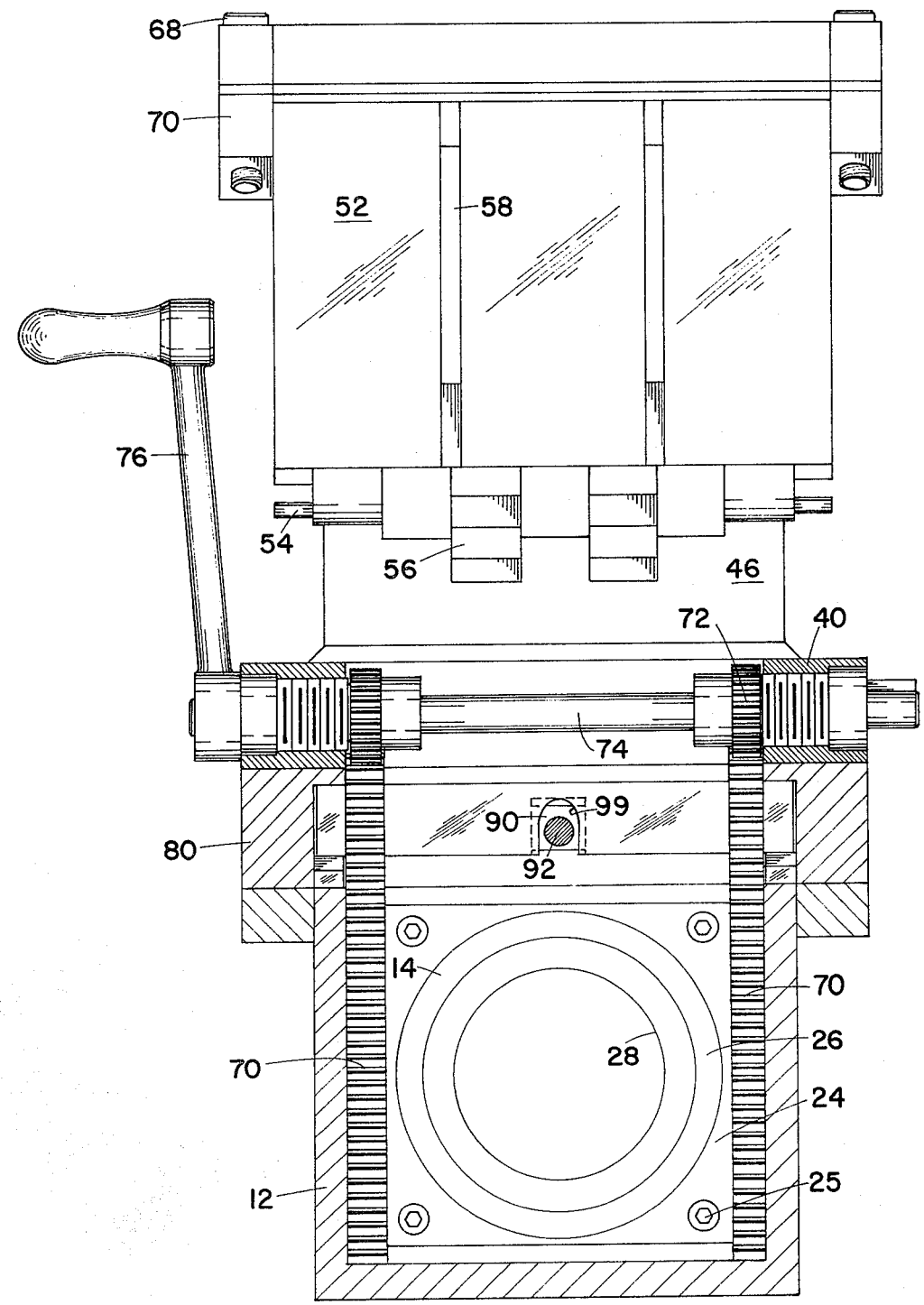
FIG. 3 is a vertical section view taken along a plane perpendicular to that of FIG. 2.

If it is desired to resume gas flow through the pipeline 22 during servicing of the orifice disc 26, the spacer block 41 of FIG. 1 which is interposed between the mounting flange 40 and the working valve body 12, is replaced by an isolation valve body 80, as shown in FIGS. 2 and 3. Disposed along the sides of the isolation valve body and out of the path of travel of the orifice disc carrier 24 and racks 70 are ramp blocks 82 having inclined upper surfaces 84. A valve gate 86 with suitable sealing means 88 has complementary sloping skids 89 to slide along the ramp surfaces 84. The gate 86 is operated by a valve actuator nut 90 carried on a threaded stem 92. Rotation of the stem 92, by rotation of the knob 94 causes the actuator nut 90 to move the valve closure member 86 with complementary sloping surfaces 96 along the ramps 84, so that the closure member 86 move inward and upward to seal against the sealing surfaces 98 of the isolation valve body 80. The upward movement being accommodated by the sliding connection 99 between the gate 86 and the actuator nut 90.

When it is desired to change or service an orifice disc 26 while in the senior mode the crank 76 is rotated to raise the racks 70 and carrier 24 to the elevated position shown in FIG. 2. Then, the isolation valve operating knob 94 is rotated to move the valve gate 86 inward and upward against the sealing surface 98 to isolate the service chamber 41. After pressures in the service chamber are balanced with the atmosphere by suitable means (not shown) the nuts 68 are loosened to release the hinge closure 52, as shown in FIG. 2, for direct access to the valve carrier 24.

After replacement of the orifice disc 26, the closure member 52 is again closed and locked at 64, the isolation valve is opened to balance pressures in the service housing 41 with those in the pipeline 22 and the crank 76 is turned to lower the orifice carrier 24 to the position shown in FIG. 1.

While this invention has been described in conjunction with a preferred embodiment thereof, it is obvious that modificatons and changes therein may be made by those skilled in the art to which it pertains without departing from the spirit and scope with this invention, as defined by the claims appended hereto.

What is claimed as invention:

1. An orifice meter comprising:
a main housing;
a service housing open at top and bottom secured to said main housing so that the open bottom thereof is in communication with said main housing;
a carrier for an orifice disc mounted in said housing for linear sliding movement therebetween;
aligned flow tubes on said main housing;
means for sealing between said main housing and said disc carrier around said flow tubes;
a rack mounted on said carrier to extend in the direction of carrier movement;
a pinion rotatable in one of said housings engaging said rack;
selectively operated means for rotating said pinion;
the upper open end of said service housing being dispsed at an acute angle to the plane of carrier movement to enable frontal placement and removal of orifice discs when said carrier is in an elevated position within said service housing;
a seal plate secured and sealed to said service housing around said upper open end;
a closure pivoted to said service housing for movement toward and away from said seal plate; and
means operative to lock said closure in face to face engagement with said seal plate.

2. The orifice meter defined by claim 1 wherein:
the outer surface of said closure and the back surface of said seal plate are chamfered along adjacent sides; and including:
a lock bar;
a groove with converging opposite sides in said lock bar to nest over said chamfered sides; and
means for forcing said lock bar firmly over said closure and seal plate.

3. The orifice meter defined by claim 1 wherein:
said pinion is mounted in said service housing; and including:
an isolation valve interposed between said main and service housings operable to seal off said service housing when said carrier is disposed therein.

4. The orifice meter defined by claim 3 wherein said isolation valve comprises:
a valve body having a passageway therethrough for said carrier;
a valve seating surface in said body around said passageway;
a pair of ramps in said valve body;
a valve gate movable in said valve body into and out of alignment with said valve seating surface;
wedge slides on the back of said gate slidable on said ramps;
a threaded valve stem extending parallel to said seating surface; and
a threaded nut engaged on said valve stem;
said valve gate being slidable on said nut for movement toward and away from said sealing surface.

* * * * *